US006257804B1

(12) United States Patent
Gathmann

(10) Patent No.: US 6,257,804 B1
(45) Date of Patent: Jul. 10, 2001

(54) POWDER METERING APPARATUS FOR DISPENSING A POWDER-AIR MIXTURE TO A CONSUMER

(75) Inventor: Egon Gathmann, Remscheid (DE)

(73) Assignee: Barmag AG, Remscheid (DE)

( * ) Notice: Subject to any disclaimer, the term of this patent is extended or adjusted under 35 U.S.C. 154(b) by 0 days.

(21) Appl. No.: 09/374,322

(22) Filed: Aug. 13, 1999

(30) Foreign Application Priority Data

Aug. 13, 1998 (DE) ..................... 198 36 782

(51) Int. Cl.[7] ..................... B65G 53/08

(52) U.S. Cl. ..................... 406/68; 406/26; 406/50; 406/85; 406/138; 406/151

(58) Field of Search ..................... 406/12, 26, 50, 406/85, 92, 52, 77, 113, 138, 151, 64, 68

(56) References Cited

U.S. PATENT DOCUMENTS

| | | | | |
|---|---|---|---|---|
| 3,269,428 | * | 8/1966 | Stockel et al. | 141/10 |
| 3,648,901 | | 3/1972 | Cade . | |
| 3,909,068 | | 9/1975 | Coucher . | |
| 4,185,942 | * | 1/1980 | Bazan | 406/85 |
| 4,227,835 | * | 10/1980 | Nussbaum | 406/52 |
| 4,391,860 | * | 7/1983 | Rotolico et al. | 406/14 |
| 4,474,327 | * | 10/1984 | Mattson et al. | 406/153 |
| 4,615,649 | * | 10/1986 | Sharpless | 406/138 |
| 4,751,948 | * | 6/1988 | Hertig et al. | 222/636 |
| 4,789,569 | | 12/1988 | Douche et al. . | |
| 5,094,403 | * | 3/1992 | Tschumi | 222/636 |
| 5,702,209 | * | 12/1997 | Mauchle | 406/12 |

FOREIGN PATENT DOCUMENTS

| | | |
|---|---|---|
| 42 42 225 | 2/1994 | (DE) . |
| 0 468 510 A2 | 1/1992 | (EP) . |
| 0 412 289 | 2/1994 | (EP) . |

* cited by examiner

*Primary Examiner*—Christopher P. Ellis
*Assistant Examiner*—Joe Dilllon, Jr.
(74) *Attorney, Agent, or Firm*—Alston & Bird LLP

(57) ABSTRACT

A powder metering apparatus for making available a powder, in particular for powder coating, and which comprises a metering pump with a rotatably driven metering disk arranged between two lateral plates. The metering pump includes an inlet, through which it receives a powder-air mixture, and an outlet that connects via a suction tube to an injector pump. From the outlet, the powder-air mixture conveyed by means of the metering disk to the outlet is sucked out by a vacuum flow that is generated in the injector pump and enters the metering pump via a suction inlet opening, and the powder-air mixture is then supplied to a consumer.

13 Claims, 3 Drawing Sheets

POWDER METERING APPARATUS FOR DISPENSING A POWDER-AIR MIXTURE TO A CONSUMER

BACKGROUND OF THE INVENTION

The invention relates to a powder metering apparatus for making available powder, in particular for powder coating.

EP 0 412 289 B1 discloses an electrostatic powder coating device, wherein an injector pump delivers coating powder by means of a conveying gas, and wherein an additional metered gas line from a source of compressed air connects to the injector pump. The metered gas line, via which metered gas is supplied to the injector pump, is intended to facilitate adjustment of the amount of conveying air and the amount of metered air to optimal values. While the introduction of metered gas into the injector pump improves controllability of an injector pump with respect to supplying a desired quantity of powder needed in particular for coating, controllability and thus metering capability of the powder quantity do however not reach the accuracy of conventional, rotatably driven metering pumps of the disk type.

DE 4 242 225 A1 discloses a powder varnish pump for producing and metering a powder, which flows under overpressure. In the described powder varnish pump, the actual feed pump is designed and constructed as a metering pump of the disk type. In this pump, one metering disk is arranged for rotation between lateral components. The metering disk has an inlet, which receives a powder-air mixture, and an outlet, which supplies the powder-air mixture to a consumer, i.e., the described coating purpose. The discharge of the powder-air mixture from the outlet of the metering pump occurs by means of compressed air. As a result of the compressed air, it is possible that powder deposits in the interior of the outlet chamber and in particular in the sealing points between the rotating metering disk and the stationary lateral components. The deposit of powder in the described areas increases the wear of the metering pump. Furthermore, the metering pump has an increased torque that may lead to a blocking of the metering pump. Likewise, there is a risk of leakage.

It is therefore the object of the invention to provide a powder metering apparatus with a metering pump known per se, which exactly meters the quantity of powder necessary for the coating, operates with little wear and high reliably, and wherein powder is largely prevented from depositing in particular in its sealing gaps.

SUMMARY OF THE INVENTION

The above and other objects and advantages of the present invention are achieved by the provision of a powder metering apparatus which comprises a metering pump with a metering disk arranged between lateral plates. The metering disk connects to a shaft that mounts a drive, which rotates the metering disk between the lateral plates. The metering disk contains receiving openings or receiving chambers or metering chambers, which receive via an inlet a powder-air mixture for the metering pump. By rotating the metering disk, the mixture is transported to an outlet, from which the powder or powder-air mixture in the openings or chambers of the metering disk is discharged. Furthermore, the powder metering apparatus comprises an injector pump. The outlet of the metering pump connects to the injector pump via a suction tube. A vacuum flow generated in the injector pump and entering the metering pump via a suction inlet opening is used to suck the powder or powder-air mixture out of the outlet or outlet chamber of the metering pump and to supply it accordingly to a consumer.

As a result of combining a disk-type metering pump known per se, which meters with great accuracy, but is subjected to relatively great wear because of the possibility of powder depositing in sealing gaps, and an injector pump whose delivery is adjustable with only relatively little accuracy, and whose reproducibility of the delivery is dependent on numerous factors, such as grain size, pouring density, formation of the fluid bed in the powder feeding device, etc., it is thus possible to accomplish a simple, reproducible adjustment of the delivery. The important variables that influence the delivery, are the rotational speed of the metering pump, the chamber size, and the pouring density. The fact that by means of the vacuum flow, the powder or powder-air mixture is sucked out of the outlet chamber of the metering pump to the application device prevents powder from depositing in sealing gaps between the metering disk and lateral disks bounding the metering disks. This reduces wear of the metering pump considerably.

According to a preferred embodiment of the invention, the injector pump comprises a first control element for controlling the vacuum flow. By means of this first control element the vacuum flow is controlled such that it prevents powder from depositing in the outlet and/or between the metering disk and the lateral plates. The magnitude of the vacuum flow, i.e., the flow rate prevailing in the injector suction tube depends in this instance, among other things, on the geometric dimensions of the injector pump and the suction air stream, which is used to generate the vacuum flow in the suction tube of the injector.

Preferably, a controller is also provided, which facilitates controlling the injector pump in pressure-regulated manner as a function of the rotational speed of the metering pump. This has the advantage that the metering pump and the injector pump can be optimally adapted to each other with respect to delivery, accuracy, and reliable operation with little wear.

According to a further embodiment, the first control element of the powder metering apparatus is arranged upstream of the suction inlet opening of the metering pump. This first control element causes a controlled air stream from a source of compressed air to enter the suction inlet opening in a flow-assisting manner.

Preferably, to assist the conveying action of the injector pump downstream of the injector pump, a second control element is provided, which causes an additional air stream to be introduced in a controllable manner. The additional air stream is used to assist in influencing purposefully the suction air stream of the injector pump and, thus, the vacuum flow with respect to the flow rate.

Preferably a third control element is provided for controlling the air stream supplied to the injector pump. The provision of the respective control elements thus permits adapting and adjusting the flow conditions and thus the operation of the metering pump as well as the discharged powder quantity purposefully and optimally to the respective cases of application.

According to a further development of the powder metering apparatus of the present invention, the first, the second, and the third control element are controllable by means of a controller.

Preferably, the powder-air mixture is generated in a fluid bed in a container of a powder metering apparatus that is connected to the inlet of the metering pump. Preferably, the fluid bed is maintained even along a feed channel that connects the container to the inlet of the metering pump. This ensures a uniform filling of the metering pump. The feed device consists of a container and a feed channel. Both the container and the feed channel comprise a fluid bed, in which an air stream flows into the powder filled in the container and thus converts the powder into a powder-air mixture. This powder-air mixture is necessary, so that the powder is able to flow uniformly.

According to a further development, at least the lateral plates of the metering pump comprise hollow spaces for the flow of a coolant. This ensures that the powder is not overheated inside the pump.

BRIEF DESCRIPTION OF THE DRAWINGS

Further advantages, characteristics, and possible applications of the invention are now described in greater detail with reference to embodiments shown in the attached drawings, in which.

DETAILED DESCRIPTION OF THE PREFERRED EMBODIMENTS

Figure 1:
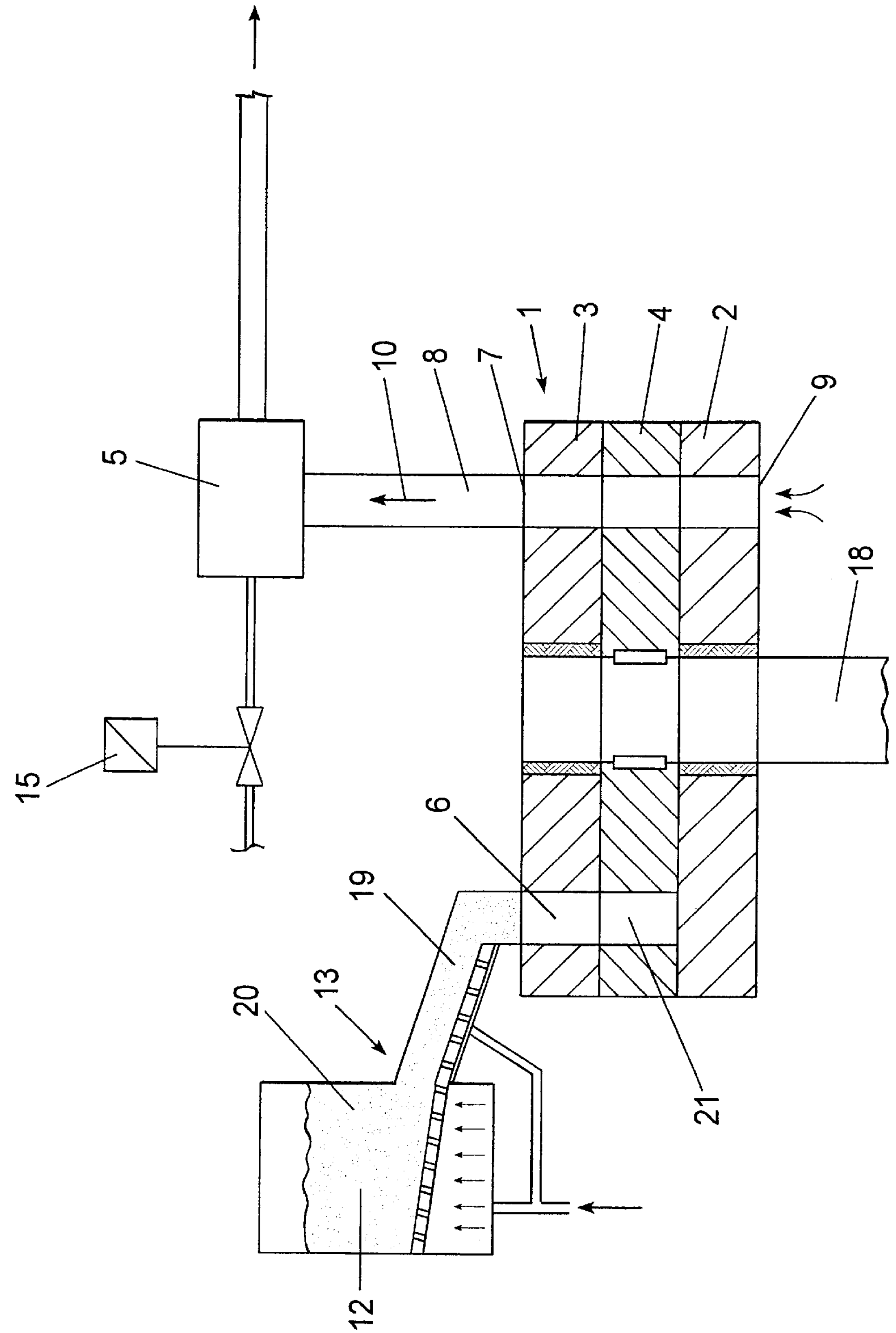
FIG. 1 illustrates a first embodiment of a powder metering apparatus of the present invention.

FIG. 1 shows a first embodiment of the invention. A metering pump 1, which includes between two lateral plates 2, 3 a metering disk 4 that is driven for rotation via a pump shaft 18 by a drive not shown, comprises an inlet 6 and an outlet 7. The metering disk 4 accommodates metering bores or metering chambers 21 that are distributed over its circumference. The inlet 6 and outlet 7 are radially spaced from the axis of rotation of pump shaft 18 with respect to the metering chambers. The inlet 6 connects to a powder feeding device 13. The powder feeding device 13 essentially consists of a feed channel 19, which connects to the inlet 6 of the metering pump 1, a container 20, and a fluid bed 12 arranged therein. The container 20 holds a powder, into which air is blown, so that the fluid bed 12 is generated in container 20. In like manner, air is blown into feed channel 19, so that it also contains a fluid bed. This causes a powder-air mixture to develop, which is supplied from container 20, via feed channel 19 and inlet 6, to the metering chambers 21 of metering disk 4. By rotating metering disk 4, the metering chambers 21 that are filled at least in part with the powder or powder-air mixture are moved to the outlet side of metering pump 1.

In a radially spaced relationship as metering bore 21 with respect to the axis of rotation of pump shaft 18, the lateral plate 2 accommodates a suction inlet end and the lateral plate 3 the outlet 7 or a corresponding outlet chamber, which connects via an injector suction tube 8 to an injector pump 5. By supplying to injector pump 5 a conveying air stream, which is controllable by means of a control element 15, the action of injector pump 5 generates in the injector suction tube a vacuum flow 10. This vacuum flow 10 causes air to be sucked in via suction inlet opening 9, and this sucked-in air causes the powder-air mixture contained in the respective metering chamber 21 that coincides with suction inlet opening 9 and outlet 7 to be discharged and to be supplied by the vacuum flow 10 to injector pump 5 through the injector suction tube. From injector pump 5, the powder or powder-air mixture reaches the consumer in the desired quantity.

As a result of generating the vacuum flow 10 by means of injector pump 5 on the outlet side of metering pump 1, it is accomplished that substantially no powder is able to deposit in sealing points between the metering disk 4 and lateral plate 2 and lateral plate 3. This reduces the wear of metering pump 1 considerably. The connection of injector pump 5 with disk-type metering pump 1 permits combining the advantages of both systems and creating a reliable, reproducible, and accurately operating powder metering system.

Figure 2:
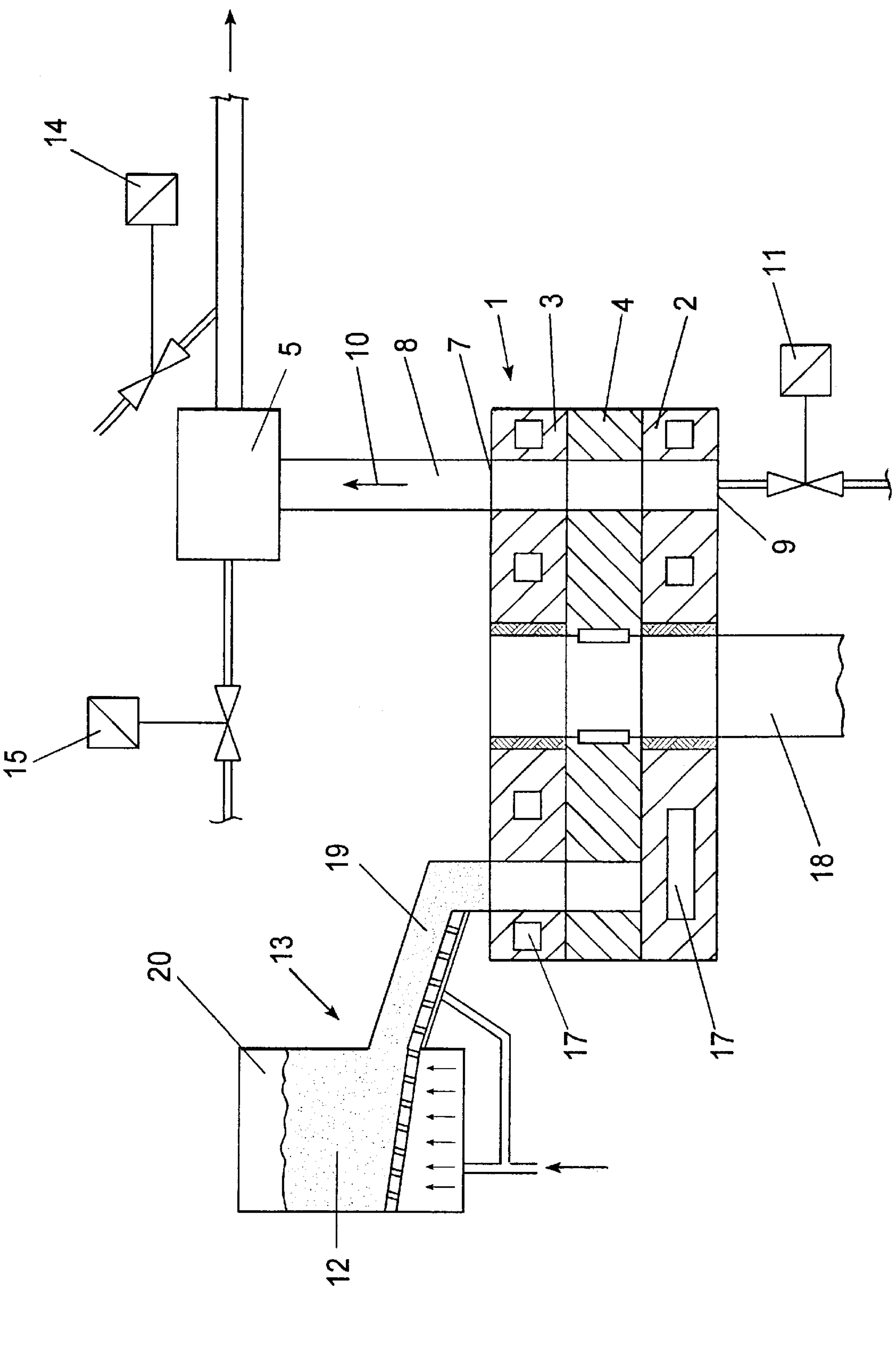
FIG. 2 illustrates a second embodiment of a powder metering apparatus of the present invention.

FIG. 2 shows a second embodiment of the invention. The basic construction and basic operation of the illustrated powder metering apparatus according to this second embodiment of the present invention correspond to those described with reference to FIG. 1. Unlike the description of FIG. 1, a first control element is provided for controlling the suction air stream at suction inlet opening 9. This first control element is used to control directly the suction air stream and thus the vacuum air stream 10 in injector suction tube 8 in a purposeful manner with respect to the desired circumstances of the particular application.

Moreover, downstream of injector pump 5, a second control element 14 is provided, which causes an additional suction air stream to enter the conveying line in a controlled manner. This permits influencing the delivery of injector pump 5 likewise in a purposeful manner.

Moreover, upstream of injector pump 5, a third control element 15 is provided, which is used to control the conveying air stream to injector pump 5. The magnitude of the conveying air stream permits controlling purposefully the suction capability of the injector pump and, thus, the vacuum flow 10 and, thus, the discharge of the powder or powder-air mixture from the outlet 7 of metering pump 1.

The lateral disks 2, 3 are each provided with corresponding hollow spaces 17, through which a coolant flows for purposes of avoiding that the powder or powder-air mixture overheats in metering pump 1.

Figure 3:
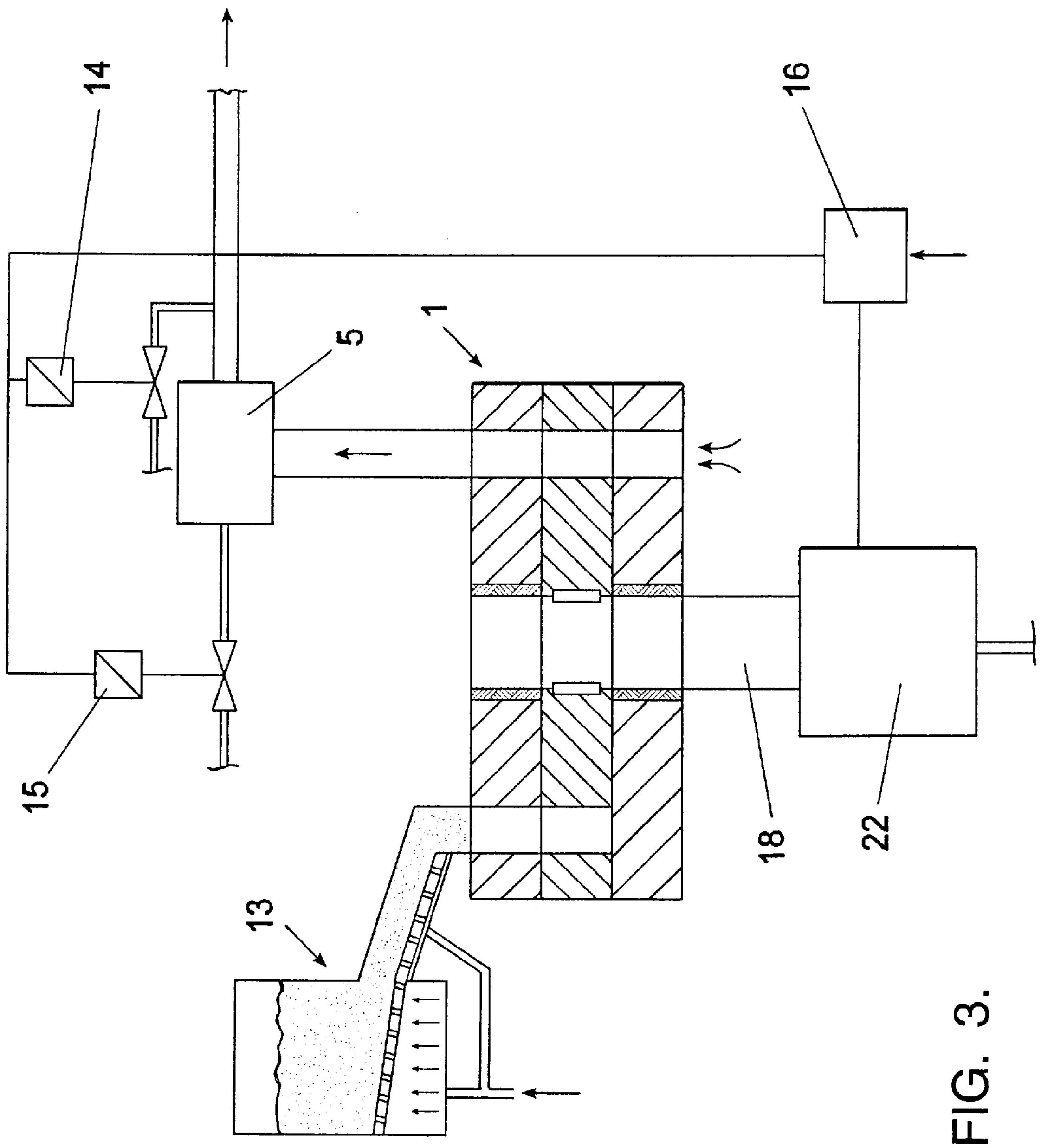
FIG. 3 illustrates a third embodiment of a powder metering apparatus of the present invention.

FIG. 3 shows a third embodiment of the invention, whose operation corresponds substantially to that described with reference to FIGS. 1 and 2. Unlike the embodiment described with reference to FIG. 2, a controller 16 is provided in addition, which electronically controls a drive 22 of metering pump 1 and the second control element for the additional suction stream as well as the third control element for controlling the conveying air stream in a manner that the pressure of the injector is controlled as a function of the rotational speed of the metering pump.

In the drawings and specification, there has been set forth a preferred embodiment of the invention, and although specific terms are employed, they are used in a generic and descriptive sense only and not for purposes of limitation.

That which is claimed is:

1. A powder metering apparatus which dispenses a powder-air mixture to a consumer, comprising a metering pump which includes a rotatably driven metering disk mounted between and immediately adjacent each of two lateral plates, with said metering disk having metering chambers distributed over its circumference, an inlet through which a powder-air mixture is serially supplied to the metering chambers of the rotating metering disk, and an outlet from which the powder-air mixture is serially removed from the metering chambers of the rotating metering disk, an injector pump connected to the outlet of said metering pump via a suction tube for generating a suction in the suction tube which serves to generate a vacuum flow which serially removes the powder-air mixture from the metering chambers of the rotating metering disc and delivers the powder-air mixture to a consumer, and a controller, by which the injector pump can be controlled in a pressure-regulated manner as a function of the rotational speed of the metering disk of the metering pump.

2. The powder metering apparatus as defined in claim 1, wherein the injector pump comprises a first control element for controlling the vacuum flow so as to prevent powder from depositing in the outlet and/or between the metering disk and the lateral plates.

3. The powder metering apparatus as defined in claim 1 wherein said lateral plates of said metering pump include at least one hollow space for the flow of a coolant.

4. The powder metering apparatus as defined in claim 1 further comprising a powder feeding device connected to said inlet of the metering pump and which comprises a container which encloses a fluid bed, a powder disposed within the container, and wherein an air stream flows through the powder to generate a moving powder-air mixture.

5. The powder metering apparatus as defined in claim 4 wherein said container is connected to said inlet via a feed channel, and wherein said fluid bed extends into said feed channel.

6. The powder metering apparatus as defined in claim 1 wherein the outlet is formed in one of the lateral plates, and the metering pump further includes a suction inlet opening formed in the other of the lateral plates and communicating with the outlet and the suction tube via the metering chambers.

7. The powder metering apparatus as defined in claim 6 further comprising a first control element positioned upstream of the suction inlet opening for controlling the supply of an air stream into the suction inlet opening.

8. The powder metering apparatus as defined in claim 7 further comprising a second control element for introducing a controllable additional air stream downstream of the injector pump for assisting in the conveying of the powder-air mixture to the consumer.

9. The powder metering apparatus as defined in claim 8 further comprising a third control element for controlling an air stream supplied to the injector pump.

10. The powder metering apparatus as defined in claim 9 wherein the first, the second, and the third control elements are each controllable by means of a controller.

11. A powder metering apparatus which dispenses a powder-air mixture to a consumer, comprising a metering pump which includes a rotatably driven metering disk mounted between and immediately adjacent each of two lateral plates, with said metering disk having metering chambers which extend through said metering disk and are distributed over its circumference, an inlet formed in one of the lateral plates through which a powder-air mixture is serially supplied to the metering chambers of the rotating metering disk, an outlet formed in one of the lateral plates from which the powder-air mixture is serially removed from the metering chambers of the rotating metering disk, and a suction inlet opening formed in the lateral plate opposite the lateral plate which has the outlet and so as to be aligned with the outlet, an injector pump connected to the outlet of said metering pump via a suction tube for generating a suction in the suction tube which serves to generate a vacuum flow extending into the suction inlet opening, through the metering chambers and outlet to the suction tube, which serially removes the powder-air mixture from the metering chambers of the rotating metering disk and delivers the powder-air mixture to a consumer, and a controller, by which the injector pump can be controlled in a pressure-regulated manner as a function of the rotational speed of the metering disk of the metering pump.

12. The powder metering apparatus as defined in claim 11 further comprising a powder feeding device connected to said inlet of said metering pump.

13. The powder metering apparatus as defined in claim 12 wherein the inlet and the outlet of the metering pump are positioned in the same lateral plate.

* * * * *